United States Patent [19]

Cisar et al.

[11] 4,445,837
[45] May 1, 1984

[54] FOAM EXTRUSION DIE AND MONITORING APPARATUS

[75] Inventors: James R. Cisar, Cuyahoga Falls; Attila Grauzer, Akron, both of Ohio

[73] Assignee: U.C. Industries, Tallmadge, Ohio

[21] Appl. No.: 422,678

[22] Filed: Sep. 24, 1982

[51] Int. Cl.³ .................. B29D 27/00; B29F 3/04; G01B 5/14
[52] U.S. Cl. ........................ 425/141; 264/40.5; 264/51; 264/101; 425/135; 425/138; 425/466; 425/817 C
[58] Field of Search ............... 425/141, 466, 149, 146, 425/135, 138, 817 C; 264/40.1, 40.5, 51, 101

[56] References Cited

U.S. PATENT DOCUMENTS

| | | | |
|---|---|---|---|
| 3,628,561 | 12/1971 | Corbett | 425/149 X |
| 3,841,812 | 10/1974 | Wright | 425/149 |
| 3,985,845 | 10/1976 | Akatsuka et al. | 425/141 X |
| 3,989,433 | 11/1976 | Furman | 425/149 |
| 3,993,421 | 11/1976 | Adair | 425/149 X |
| 4,124,342 | 11/1978 | Akatsuka et al. | 425/141 |
| 4,125,350 | 11/1978 | Brown | 425/141 X |
| 4,211,739 | 7/1980 | Phipps | 264/51 |
| 4,234,529 | 11/1980 | Phipps | 264/51 |
| 4,260,351 | 4/1981 | Takano et al. | 425/149 X |

FOREIGN PATENT DOCUMENTS 54-146859 11/1979 Japan .................. 425/141

OTHER PUBLICATIONS

Scheiner, Lowell L., Mang. Edt. "With Resin Short Prices Up . . . Can Computer-Controlled Extrusion Help?", In *Plastics Technology*, Feb. 1974, pp. 43–49.

*Primary Examiner*—Philip E. Anderson
*Attorney, Agent, or Firm*—Maky, Renner, Otto & Boisselle

[57] ABSTRACT

A foam extrusion die and monitoring apparatus, including a pair of adjustable die lip members having opposed, rigid die lips defining therebetween an elongated arcuate die orifice, is characterized by position sensors located along the arc of the die lips to monitor the die opening at such locations. The position sensors include sensing styli mounted for movement with the lip members at respective sensing locations such as at the arc ends and arc centers of the die lips, and provision is made for connecting the sensing styli as by precision push-pull, flexible cables to respective linear variable displacement transformers which provide electrical output signals representative of sensed positions to remotely located monitoring circuitry. The apparatus has particular application in a vacuum extrusion line wherein the extrusion die is located inside a vacuum chamber and thus is inaccessible during extrusion. In such application, the apparatus provides immediate read-out of die lip position data outside of the vacuum chamber for use in accurately obtaining and maintaining desired die orifice size and shape.

38 Claims, 5 Drawing Figures

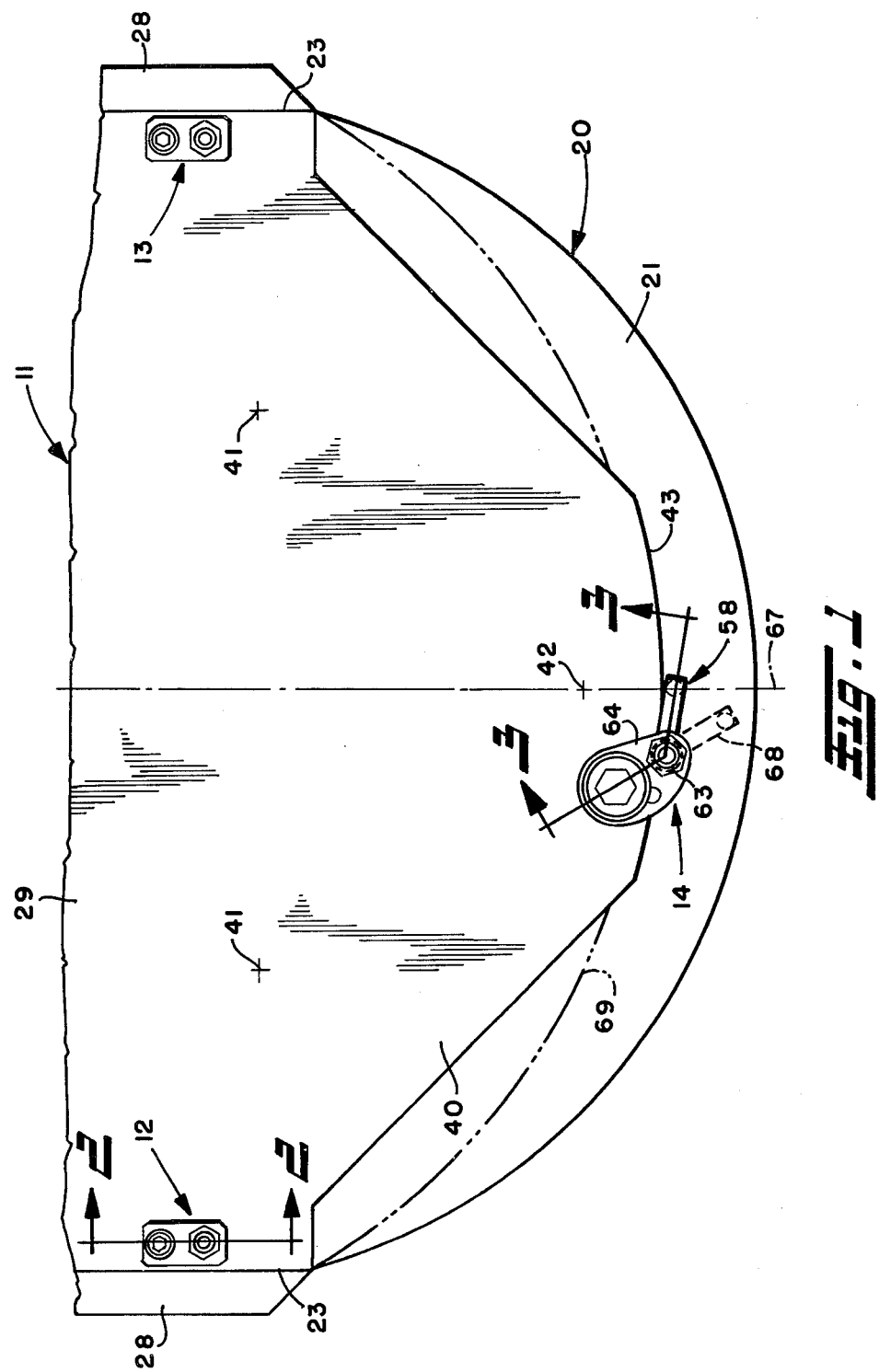

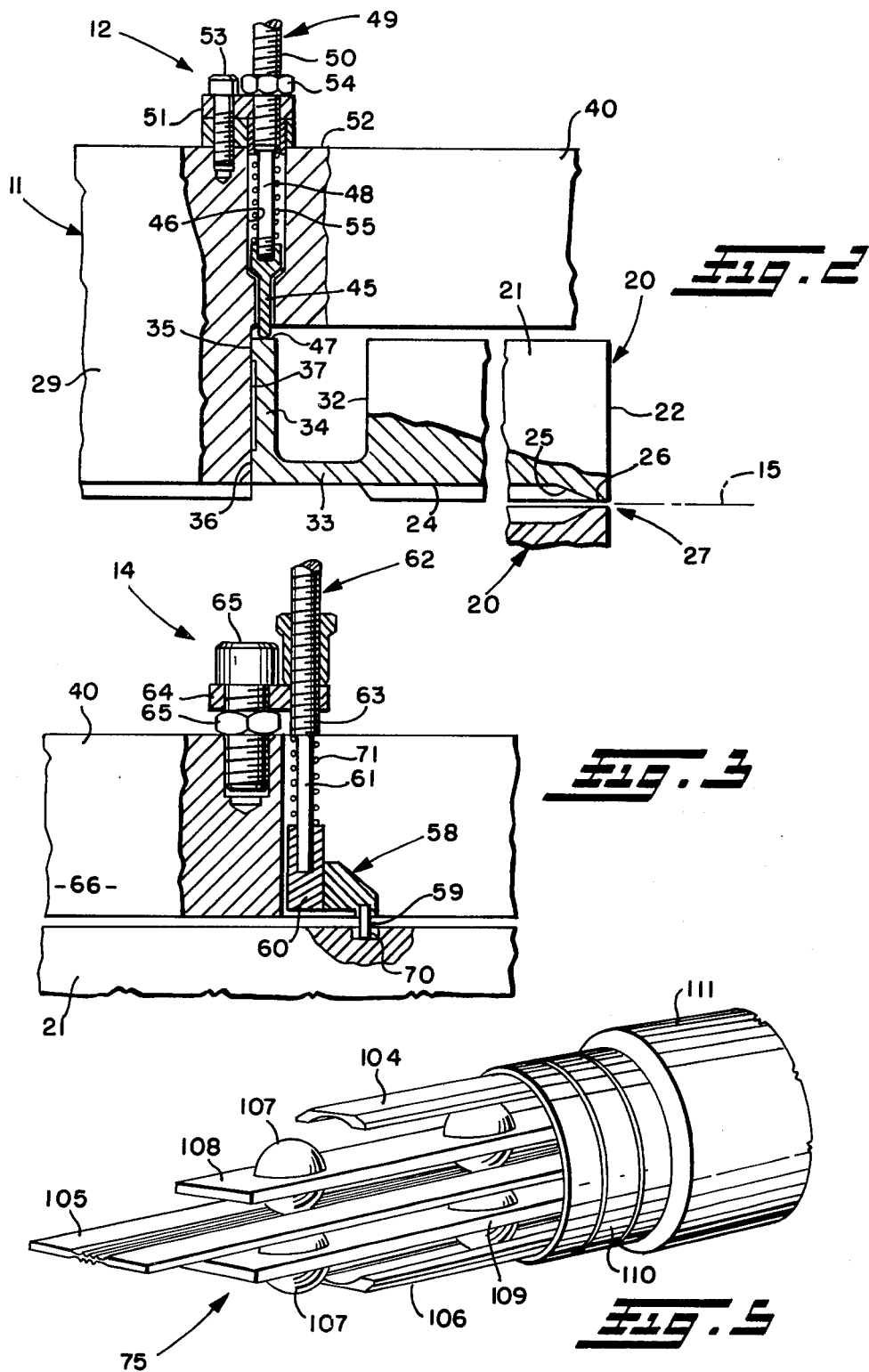

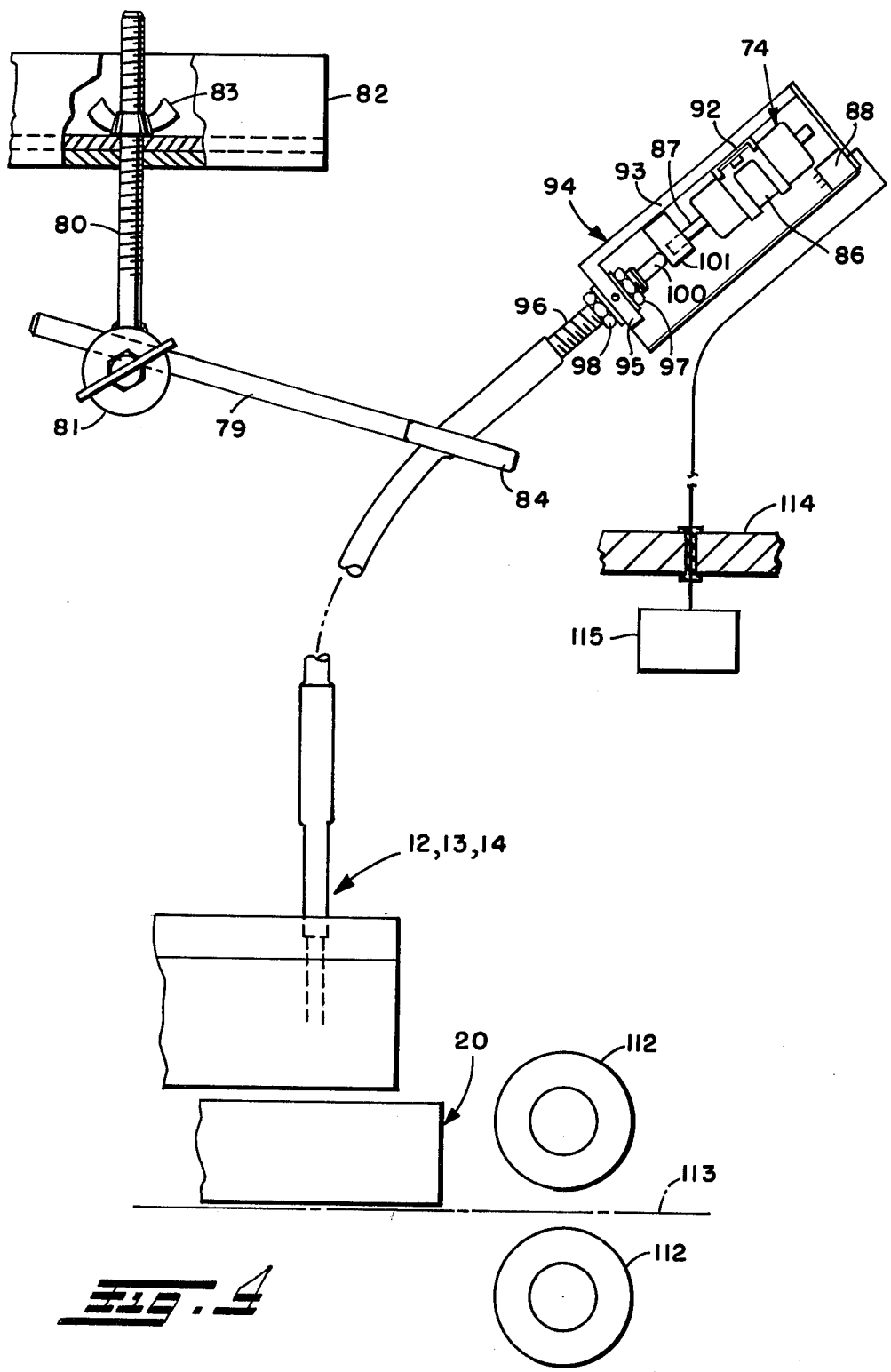

FOAM EXTRUSION DIE AND MONITORING APPARATUS

The present invention relates generally to an extrusion die and monitoring apparatus having provision for adjusting and monitoring the size and shape of the die orifice and, more particularly, to a foam extrusion die and monitoring apparatus employing adjustable arcuate die lips and position sensors which provide for remote monitoring of the die orifice size and shape such as in applications where the extrusion die is located inside and environmental control or vacuum chamber.

BACKGROUND

As is known, the formation of extruded foam cellular products such as foam boards, planks and billets is enhanced by the employment of a vacuum chamber so that expansion of foaming material exiting an extrusion die takes place under sub-atmospheric pressure. To this end and because of the delicate and fragile nature of the extruded foam, vacuum extrusion lines have employed an inclined barometric leg of substantial length which, at its upper end, defines a vacuum chamber into which the foaming material is extruded and formed to its final shape before it is guided by a conveyor along the length of the barometric leg. At its lower end, the barometric leg extends at a shallow angle into a pool of water, and the conveyor continues through a large radius in the pool to guide the foam extrudate through and from the pool for further processing such as cutting to size and length. In a full size foam extrusion line, the barometric leg may be more than 50 meters in length and the large radius portion of the conveyor in the pool may be more than 30 meters in length. Accordingly, the foam extrudate may have a length of more than 80 meters by the time the lead end thereof exits the pool.

Because the extruded foam generally assumes a cross-section different than that of the die orifice through which it is extruded, extrusion dies advantageously have employed a pair of adjustable, rigid die lips which together define therebetween an elongated, axially outwardly extending arcuate die orifice through which the foaming material moves both internally and axially outwardly relative to the die lips. Since the die lips necessarily are located inside the vacuum chamber and thus inaccessible during extrusion, provision has been made for remotely adjusting the die lips from outside the vacuum chamber. The purpose of adjusting is to vary the size and shape of the die orifice which controls to a substantial degree the thickness and profile of the extruded product.

As is a customary practice, the die lips initially are set at the beginning of a production run to provide a die orifice size and shape which past experience has found will approximately give the desired thickness and profile of the extruded product. The size and shape of the die orifice however will usually change because of heat and pressure expansion and any looseness or backlash freedom in the die lip adjusting mechanisms when the die lips and associated hardware are subjected to the high temperature and pressures of the extrusion process. This accordingly necessitates adjustment of the die lips.

Since the die lips inside the vacuum chamber and inaccessible to the extrusion line operator, adjustments made from outside the vacuum chamber are indeterminate as no die orifice measurements can be made. This necessitates the making of several die adjustments, each constituting an educated guess as to what the adjustment will produce in terms of die orifice size and shape and resultant product thickness and profile. Accordingly, measurements of the final product thickness and profile must be taken and corrective die lip adjustments made to bring the product within specification. As was customary practice, product measurements were taken after the product could be gotten to upon exiting the pool at the end of the barometric leg. As a result, a substantial length of off-specification or scrap product, such as more than 80 meters as indicated above, would have to be run before measurements were taken and the extrusion die adjusted accordingly. Moreover, the results of any adjustment would not be determined until an additional length of product was run and measurements taken some five to 20 minutes later. Such procedure, needless to say, results in substantial scrap and lost time.

SUMMARY OF THE INVENTION

A foam extrusion die and monitoring apparatus according to the present invention provides for remote monitoring of the die orifice and has particular application in a vacuum extrusion line wherein the extrusion die is inaccessible by reason of being located in an environmental control or vacuum chamber. Even in an atmospheric extrusion line, the apparatus of the invention provides for direct monitoring of the die orifice which otherwise would be difficult to accomplish because of extrudate exiting therefrom.

Briefly, the extrusion die and monitoring apparatus includes a pair of die lip members having opposed, rigid die lips which together define therebetween an elongated, arcuate die orifice. At least one of the die lips is adjustable to vary the size and shape of the die orifice, and position sensors are located along the arc thereof to monitor die lip position at such locations and thus the size and shape of the die orifice. The position sensors include sensing styli mounted for movement with the die lip at respective sensing locations such as at the arc ends and are center thereof, and provision is made for connecting the sensing styli to respective transducers which provide output signals representative of sensed positions to remotely located monitoring circuitry. In a vacuum extrusion line wherein the extrusion die is located inside a vacuum chamber and therefore is inaccessible during extrusion, the apparatus provides immediate readout of die lip position data outside of the vacuum chamber for use in accurately obtaining and monitoring desired die orifice size and shape.

More particularly, both the die lips are pivotally adjustable as a whole along chordal flex lines defined by flexible chordal legs of die lip members. The die lip members have feet at the ends of the legs opposite the die lips which are adjustably and sealingly clamped to a die body for adjustment perpendicularly to the extrusion plane defined by the die lips. Accordingly, the relative angular inclination and spacing of the die lips can be adjusted to vary the size and shape of the die orifice.

Associated with the die lips are respective position sensors located, in particular, at the arc center and arc ends of the die lips. The sensing styli of the position sensors are mounted such as on the die body for guided movement normal to the extrusion plane in unison with die lip movements at respective sensing locations, and provision is made for connecting the sensing styli as by precision, flexible, push-pull cables to conveniently mounted transducers. The transducers employed are linear variable displacement transformers which provide electrical output signals representative of sensed positions to monitoring circuitry located, for instance, outside an environmental control or vacuum chamber containing the extrusion die. Accordingly, immediate readout of die lip position data may be provided outside the vacuum chamber for use in accurately obtaining and directly monitoring the die orifice size and shape without having to wait for the product to exit the vacuum chamber and any associated extrusion line components. Of course, provision also would be made for remote adjustment of the extrusion die from outside the vacuum chamber.

To the accomplishment of the foregoing and related ends, the invention, then, comprises the features hereinafter fully described and particularly pointed out in the claims, the following description and the annexed drawings setting forth in detail a certain illustrative embodiment of the invention, this being indicative, however, of but one of the various ways in which the principles of the invention may be employed.

BRIEF DESCRIPTION OF THE DRAWINGS

In the annexed drawings:

FIG. 1 is a top plan view of a foam extrusion die and monitoring apparatus according to the invention;

FIG. 2 is a vertical section through the apparatus taken substantially along the line 2—2 of FIG. 1;

FIG. 3 is another vertical section through the apparatus taken substantially along the line 3—3 of FIG. 1;

FIG. 4 is a partly schematic elevation of the apparatus; and

FIG. 5 is a perspective view, partly broken away, of a preferred form of linear motion transmission cable employed in the apparatus.

DETAILED DESCRIPTION

Referring now in detail to the drawings and initially to FIG. 1, a foam extrusion and monitoring apparatus according to the invention is designated generally by reference numeral 10 and can be seen to comprise an extrusion die 11 and position sensors 12–14. The extrusion die illustrated is of the type described and shown in applicants' assignee's U.S. patent aplication Ser. No. 250,273, filed Apr. 2, 1981, and entitled "Foam Extrusion Die Assembly", which is hereby incorporated herein by reference. Accordingly, reference may be had to such application for particulars of the extrusion die components and operation, the herein pertinent aspects of which will hereinafter be described and discussed. It further is noted that essentially only the upper half of the apparatus 10 is shown in the drawings, it being understood that the lower half thereof essentially may be identical in construction and operation, but oppositely oriented with respect to the center or extrusion plane of the die indicated at 15 in FIG. 2. Accordingly, the hereinafter description of such upper half for the most part is equally applicable to the lower half of the apparatus assuming vertical reversal of the drawing figures.

The extrusion die 11 comprises a pair of adjustable die lip members 20, only the uppermost portion of the lower die lip member being shown in FIG. 2. The die lip members 20, which have a plate-like shape and are oppositely facing, each have an axially outer die lip or lip portion 21. As viewed from the top (see FIG. 1), the die lip 21 can be seen to be substantially in the form of a minor segment of a circle and has an arcuate outer face 22 that terminates at axially extending side faces 23 of the die lip member 20. The die lip further has, at its vertically innermost side, a palate-shape cavity 24. The cavity 24 has a smoothly sloping arcuate surface 25 that slopes from the bottom of the cavity 24 to the perimeter of the die lip at its outer face 22. At the intersection of the sloping surface 25 and outer face 22 is a die land 26 which may be flattened to any desirable degree. As seen in FIG. 2, the die lands 26 of the die lips 21 define the top and bottom edges of a die opening or orifice 27 and thus the extrusion plane 15. As for the ends of the arcuate die orifice 27, such can be seen in FIG. 1 to be defined by choker bars 28 which are secured to a die body 29. The choker bars 28 span the gap between the die lip members and are in sliding contact with the side faces 23 thereof.

The die lip members 20 are secured to the die body 29 as in the manner disclosed in the aforementioned U.S. patent application Ser. No. 250,273. Accordingly, the associated securement hardware is not shown for the sake of clarity in showing and describing the novel aspects of the present invention. It is noted, however, that such securement is effected by means of a clamp or retainer bar locatable in a deep transversely extending groove 32 in the vertically outermost side of each lip member 20. Such groove 32 extends chordally with respect to the subtended arc of the die lip 21 and defines or forms a thin flexible leg 33 and foot 34 of the lip member 20. The flexible leg 33 extends axially inwardly from the die lip 21 whereas the foot 34 extends vertically outwardly from the end of the leg. It is the foot 34 which is clamped to the die body 29 by the aforementioned retainer bar, such foot being urged into sealing and sliding engagement at full width toe and heal projections or seals 35 and 36 with an accurately machined die body end face 37. Accordingly, the toe and heel projections provide two spaced, continuous high-pressure seals between the die lip member and die body face 37 while permitting vertical adjustment of the die lip or, more accurately, vertical adjustment of the foot 34 of the die lip member. As both die lip members 20 are similarly mounted to the die body, vertical adjustment of one or both die lip members effects corresponding adjustment of the spacing or gap between the feet thereof. As should be evident, such adjustment of the spacing between the feet effects a certain related adjustment of the spacing or gap between the chordal or arc ends of the die lips 21.

With the foot 34 of the die lip member 20 securely and sealingly clamped to the die body 29 in the aforedescribed manner, the die lip 21 will be supported on or suspended from the die body in cantilevered manner by the flexible leg 33 and foot 34. Because the die lip essentially constitues a non-deformable or rigid body because of its substantially greater thickness than the leg 33, it should be apparent that flexing or bending of the flexible leg will pivot the die lip as a whole about a chordal flex line. Accordingly, the angular inclination of the die lips with respect to one another may be varied. In doing so, the die orifice 27 may be opened or closed more or mainly at the arc center thereof then at its arc ends to define an arcuate, concave or convex die orifice.

To effect desired adjustment of the spacing between and relative angular inclination of the die lips 21, die lip and foot adjustment screws may be provided in the manner disclosed in the aforementioned U.S. patent application Ser. No. 250,273. The adjustment screws for each die lip are journaled in respective bores in a corresponding die body end projection, the end projection corresponding to the upper die lip member being seen at 40 in FIGS. 1 and 2. As shown, the die body end projection 40 has a truncated triangular shape and extends generally axially outwardly from the end face 37 of the die body with the corresponding lip member 20 being positioned vertically inwardly of such end projection. Although the foot adjustment screws and bores therefor are not shown, the centers thereof are indicated at 41 in FIG. 1 whereas the center of the die lip adjustment screw and bore is indicated at 42. Accordingly, the foot adjustment screws are located near opposite ends (widthwise) of the foot 34 whereas the lip adjustment screw is located near the arc center of the die lip and spaced slightly inwardly from end face 43 of the die body end projection.

Referring now to the position sensors 12-14, it can be seen in FIGS. 1 and 2 that the sensors 12 and 13 are located at the arc ends of the die lip 21 whereas the sensor 14 is located at the arc center of the die lip. More specifically, the sensors 12 and 13 are located at opposite ends of the foot 34 of the lip member 20. The sensors 12 and 13 are similar and thus for the sake of brevity only the sensor 12 will now be described in detail.

As seen in FIG. 2, the position sensor 12 includes a sensing stylus 45 which is vertically linearly movable in a vertical bore 46 provided in the die body end projection 40. The sensing stylus 45 has a reduced diameter, vertically innermost end or needle portion which projects through and from a smaller diameter portion of the bore 46 into engagement with the vertically outermost face 47 of the foot 34 at the respective end thereof. At its vertically outermost end, the sensing stylus 45 has a larger diameter portion threaded on an end rod 48 of a linear motion transmission cable 49. Such end rod 48 is guided for linear vertical movement in an externally threaded cable end sleeve 50 which is threaded in a mounting block assembly 51 mounted to the die body end projection 40 at the vertically outermost surface 52 thereof by fastener 53. To lock the cable end sleeve 50 in place while permitting adjustment thereof in the mounting block assembly, a jam nut 54 is provided. Also provided, on the end rod 48 between the end of the cable end sleeve 50 and the stylus 45, is a coil spring 55 which serves resiliently to urge the stylus into engagement with the vertically outermost face 47 of the foot 34 as indicated. Accordingly, the stylus will track or move in unison with the respective end of the foot during vertical adjustment of the foot in the manner indicated above and mill drive the end rod 48 accordingly.

The position sensor 14 also includes a sensing stylus, but of a different form as seen at 58 in FIGS. 1 and 3. The sensing stylus 58 includes a short vertically extending pin or needle 59 that depends from the outer end of a horizontal arm of an L-shape pin or needle mount 60. The vertical arm of the needle mount 60 is threaded or otherwise secured on an end rod 61 of a linear motion transmission cable 62. Such end rod is guided for linear vertical movement in a vertically extending, externally threaded cable end sleeve 63 which is threaded in a mounting block 64 secured to the die body end projection 40 at the vertically outermost surface thereof by fasteners 65.

As seen in FIGS. 1 and 3, the mounting block 64 holds the cable end sleeve 63 and the associated end rod 61 and sensing stylus 58 axially outwardly offset from the end face 43 of the die body end projection 40. It also can be seen that the end of the mounting block 64 secured to the die body end projection 40 is transversely offset from the die axis indicated at 67. This may be necessary when, as desired, the die lip adjustment screw is located at 42 on the die axis 67 near the end face 43 of the die body end projection. Moreover, this permits swinging adjustment of the stylus 58 for locating the needle 59 thereof in close proximity with the arc center of interchangeable arcuate die lip members 20 of different radii. Such swinging may be accomplished by rotating the end rod 61 on its axis, this being permitted by a cable of the type hereinafter described. Accordingly, the stylus may be adjusted, for example, to the solid line position thereof seen in FIG. 1 or to the phantom line position thereof indicated at 68. Moreover, the die body end projection may be recessed or slotted at the end face 43 thereof to accommodate axially inward swinging of the stylus for engaging the needle 59 thereof with a die lip of relatively large radius such as that shown in phantom lines at 69.

To limit such swinging movement of the sensing stylus 58 during position sensing of the die lip 21 at or near the arc center thereof, the needle 59 is resiliently urged into a hole or slot 70 provided in the vertically outermost surface of the die lip by a spring 71 disposed between the end of the cable end sleeve 63 and vertical arm of the needle mount 60. In addition, the spring 71 serves to maintain the stylus 58 in tracking engagement with the vertically outermost surface of the die lip or, more accurately, the bottom of the slot 70. Accordingly, the sensing stylus will track or move in unison with the center arc portion of the die lip during pivotal adjustment thereof in the manner indicated above.

Referring now to FIG. 4, it will be appreciated that each position sensor 12, 13, 14 is connected by its respective cable to a respective transducer 74 capable of producing an output signal representative of sensed positions. Although only one cable and associated transducer are shown, such is representative of those associated with each position sensor. Accordingly, the cable illustrated in FIG. 4 will be designated by reference number 75, such being representative of the aforementioned cables 49 and 62.

It also is noted that in some instances, the cable 75 or other suitable motion transmission device need not be employed where space and other factors permit mounting of the transducer 74 at the respective position sensor and direct coupling thereof to the sensing stylus of the position sensor. Otherwise, the transducer may be conveniently mounted in close proximity to the extrusion die 11 or some distance away by employing a cable of appropriate length. It, however, usually will be preferred to minimize cable length to the extent possible as frictional resistance to the movement of the cable action element generally is directly proportional to the length of the cable.

For longer cables, an adjustable cable support assembly 78 may be provided. The cable support assembly 78 includes a pair of articulated link members 79 and 80 which are adjustably and fixably connected at adjacent ends by a thumb clamp and pivot assembly 81. The support assembly may be supported by a suitable frame structure 82 with the remote end of the link 80 being mounted thereto in depending fashion by means of a wing nut 83. The remote end of the other link 79 is provided with a cable support ring 84 through which the cable 75 extends.

The illustrated transducer 74 is a linear variable displacement transformer (LVDT) which includes a housing 86 for a stationary coil and an armature 87 that moves within the hollow core of the stationary coil. As is conventional, the coil has a primary winding in the middle, and two secondaries, wired in series opposition. When the primary coil is energized such as via a lead wire connecting plug 88 mounted on a cover plate 89 for the LVDT, the armature 87, made of magnetic material, induces a voltage from the primary to the secondary windings. The position of the armature within the core of the stationary coil determines the level of the voltage at each secondary winding. If the armature is placed precisely midway between the two secondary windings (null position), the induced voltage in each secondary winding is equal and opposite, and there is no output. But as the armature is moved in either direction away from null position, the LVDT produces an output voltage that is proportional to the displacement of the armature from such null position and whose phase relationship with the primary supply shows whether the armature has moved nearer one end or the other of the coil. Thus, for each position of the armature, there is a definite output voltage, different in level and polarity than for any other position, no matter how slight the difference.

As seen in FIG. 4, the stationary coil housing 86 of the LVDT 74 is mounted by a clamp assembly 92 to the long leg 93 of an L-shaped bracket 94. The bracket 94 in turn would be mounted to suitable supporting structure although not shown. Secured to the short leg 95 of the bracket is the end of the cable 75 opposite the end thereof connected to a sensing stylus. More specifically, a cable end sleeve 96 extends through a hole in the short leg 95 and is fixed in place by opposed jam nuts 97 and 98.

Guided for linear movement by the cable end sleeve 96 is a cable end rod 100 which projects therethrough in axial alignment with the armature 87 of the LVDT 74. The end rod preferably is provided with a rounded tip which bears against an adjustment plate 101 threaded on the projecting end of the armature. By rotating the armature in the adjustment plate, fine adjustments can be made to zero the armature in relation to the stationary coil given a zero or set position of the corresponding die lip 21. This may be done after rough adjustments have been made by using adjustment plates of different axial thicknesses or by axially adjusting the coil housing 86 in its clamp assembly 92, for example. It is noted that the adjustment plate 101 has a side face which slides on the long leg 93 of the mounting bracket 94 to preclude rotation thereof along with the armature 87.

Referring now to FIG. 5, a preferred form of cable 75 is illustrated. Although such cable is conventional, it has been found to provide advantageous results in an apparatus according to the subject invention. As seen in FIG. 5, the cable 75 includes three stainless steel blades or races 104-106 which are diametrically separated by two rows of free-floating stainless steel ball bearings 107 held in position by stainless steel or Teflon ball guides 108 and 109. The center blade or race 105 serves as the action element for transmitting linear or push-pull motion from the corresponding sensing stylus to the corresponding LVDT armature. Such center blade accordingly is connected at opposite ends to the respective aforementioned end rods of the cable which are guided in their respective cable end sleeves. It will be appreciated that the outer blades or races 104 and 106 are connected to the end sleeves and carry the resultant reactive loads. In addition, the races are radially supported by a crush-resistant steel casing 110 with a heavy plastic covering 111. It also will be appreciated that such a cable provides a high degree of flexibility because the assembly of balls, ball guides and races, helixes within the casing to allow multi-plane bending. At the same time, the cable effects transmission of input motion with minimum friction, negligible backlash and constant repeatability.

The foregoing apparatus 10 as described has particular application in a vacuum foam extrusion line. For example, the apparatus may be provided in an extrusion line of the type described and referred to in applicants' assignee's U.S. Pat. No. 4,211,739 wherein the extrusion die is contained within a vacuum chamber defined at the upper end of a barometric leg. As disclosed in such patent and referred to in the aforementioned U.S. patent application Ser. No. 250,273, provision may be made for remotely adjusting the arcuate die lips from outside the vacuum chamber. Also, forming and shaping apparatus may be positioned adjacent and immediately downstream of the extrusion die orifice as in the manner disclosed in applicants' assignee's U.S. Pat. No. 4,234,529. In FIG. 4, the innermost opposed curved rolls of such an apparatus are indicated at 112 and can be seen to be positioned on opposite sides of the extrudate path 113.

With the present invention, the die lip opening at given or selected locations may be read or sensed by the monitor inside the vacuum chamber 114 and a remote readout thereof provided outside the vacuum chamber as by a meter 115, as schematically shown in FIG. 4, to provide an immediate indication outside the chamber of die orifice changes resulting from die lip adjustments or from reaction forces acting on the die lips. Accordingly, the die orifice can be continuously monitored and immediate and responsive adjustments made outside the chamber in order to obtain and maintain a desired shape and size of the die orifice. To further aid in obtaining the desired profile and thickness of the extruded product, the subject apparatus may be used along with that described and shown in applicants' assignee'a copending U.S. patent application entitled "Extrusion Apparatus and Control System," filed Sept. 24, 1982 and assigned Ser. No. 422,679.

It also is noted that while the illustrated three sensors and respective locations were chosen as being sufficient to provide position data representative of the entire die orifice, advantageous results also may be obtained by a different number of sensors at locations other than those shown. Moreover, the sensors associated with each die lip need not necessarily be located in opposition to those of the other die lip, although this is preferred and greatly facilitates interpretation and use of position read-out data.

Although the invention has been shown and described with respect to a preferred embodiment, it is obvious that equivalent alterations and modifications will occur to others skilled in the art upon the reading and understanding of this specification. The present invention includes all such equivalent alterations and modifications, and is limited only by the scope of the following claims.

The embodiments of the invention in which an exclusive property or privilege is claimed are defined as follows:

1. An extrusion die and monitoring apparatus comprising a pair of opposed die lips at least one of which is adjustable to vary the size and shape of a die orifice defined between said die lips, and plural sensor means located along the die lips for directly sensing the position of a die lip at respective locations to effect monitoring of the die orifice size and shape.

2. An apparatus as set forth in claim 1 wherein said die lips are arcuate.

3. An apparatus as set forth in claim 2, wherein such locations are at the arc center and arc ends of said die lips.

4. An apparatus as set forth in claim 1, wherein said sensor means includes position sensing styli movable with said one die lip at such locations.

5. An apparatus as set forth in claim 4, wherein means are provided for urging said sensing styli into tracking engagement with said one die lip at such locations.

6. An apparatus as set forth in claim 5, wherein means are provided for mounting said sensing styli for movement normal to the extrusion plane defined by said die lips.

7. An apparatus as set forth in claim 5, wherein at least one of said sensing styli is mounted for swinging movement about an axis normal to the extrusion plane.

8. An apparatus as set forth in claim 7, wherein said one sensing stylus includes a die lip engaging needle offset from the swing axis.

9. An apparatus as set forth in claim 4, wherein means are provided for connecting said sensing styli to respective transducers operative to produce output signals representative of sensed positions.

10. An apparatus as set forth in claim 9, wherein said transducers include linearly variable displacement transformers.

11. An apparatus as set forth in claim 9, wherein said means for connecting includes precision, push-pull cables connected at opposite ends to respective sensing styli and transducers.

12. An apparatus as set forth in claim 11, wherein said cables are adjustably connected to at least one of the respective sensing styli and transducers.

13. An apparatus as set forth in claim 11, wherein said cables include linearly guided end rods, and said sensing styli are mounted on respective end rods.

14. An apparatus as set forth in claim 13, wherein said end rods are linearly guided in respective cable end sleeves.

15. An apparatus as set forth in claim 14, wherein means are provided for mounting said cable end sleeves with their axes extending normal to the extrusion plane defined by said die lips.

16. An apparatus as set forth in claim 11, wherein said cables each include three races diametrically separated by two rows of ball bearings, the innermost of which is connected at opposite ends to the respective sensing stylus and transducer.

17. An apparatus as set forth in claim 16, wherein said innermost race is connected to the respective sensing stylus and transducer by respective end rods, and each cable includes end sleeves in which respective end rods are guided for linear movement.

18. An apparatus as set forth in claim 17, wherein means are provided for urging said sensing styli into tracking engagement with said one die lip at such locations.

19. An apparatus as set forth in claim 1, wherein means are provided for connecting said sensor means to respective transducers operative to produce output signals representative of the die orifice.

20. An apparatus as set forth in claim 19, wherein said die lips are locatable in an environmental control chamber, and means are provided for connecting said transducers to monitoring circuitry located outside of said chamber.

21. An apparatus as set forth in claim 20, wherein provision is made for remote adjustment of said one die lip outside of said chamber.

22. An apparatus as set forth in claim 20, wherein said sensor means includes sensing styli movable with said one die lip at such locations, and means are provided for mechanically connecting said sensing styli to respective transducers.

23. An apparatus as set forth in claim 22, wherein said transducers include linear variable displacement transformers.

24. An extrusion die and monitoring apparatus comprising a pair of die lip members having rigid, arcuate die lips defining a die orifice, at least one of which has a flexing chordal portion to the rear of the die lip to enable such die lip to be pivoted as a whole along said flexing portion adjustably to define an arcuate, concave or convex die orifice, and sensor means located along the arc of said die lip to monitor the die opening at such locations.

25. An apparatus as set forth in claim 24, wherein said die lip is in the form of a chordal segment of a circle.

26. An apparatus as set forth in claim 24, wherein such locations are at the arc center and arc ends.

27. An apparatus as set forth in claim 24, further comprising a die body, and wherein said one die lip member includes a foot adjustably yet fixedly secured to said die body, said foot being at the end of said flexing portion opposite said die lip.

28. An apparatus as set forth in claim 27, wherein said foot is adjustable towards and away from the extrusion plane principally to vary the die orifice size at the ends of the arc.

29. An apparatus as set forth in claim 28, wherein said sensing means includes sensing styli at opposite ends of said foot and movable therewith.

30. An apparatus as set forth in claim 29, wherein said sensor means further includes a sensing stylus at the arc center of said die lip and movable therewith.

31. An apparatus as set forth in claim 30, wherein means are provided for connecting said sensing styli to respective transducers operative to produce output signals representative of sensed positions.

32. In combination with an extrusion line, a closed chamber, an extrusion die within said chamber, and a monitor operative to read the die opening at selected locations by directly sensing the positional condition of said die at such locations.

33. A combination as set forth in claim 32 wherein said monitor is inside said closed chamber and the readout is outside said chamber.

34. A combination as set forth in claim 33 wherein said monitor includes means operative to produce output signals representative of the die opening at such selected locations, and means are provided for connecting said means to readout means located outside said chamber.

35. A combination as set forth in claim 33 wherein said extrusion die includes opposed die lips defining the die orifice therebetween, and said monitor includes sensor means located along said die lips to monitor the die opening at such selected locations.

36. A combination as set forth in claim 35 wherein means are provided for connecting said sensor means to respective transducers operative to produce output signals representative of die lip position at such selected locations, and means are provided for connecting said transducers to readout means located outside said chamber.

37. A combination as set forth in claim 36 wherein said die lips are arcuate and said sensor means are located along the arc of said die lips.

38. A combination as set forth in claim 36 wherein said readout means includes a display located in the proximity of remote adjustment devices for said die lips.

* * * * *